July 7, 1959
J. F. ALLING ET AL
2,893,137
PORTABLE TRAINING DEVICE FOR ELECTRIC
ACCOUNTING MACHINE OPERATORS
Filed July 22, 1957
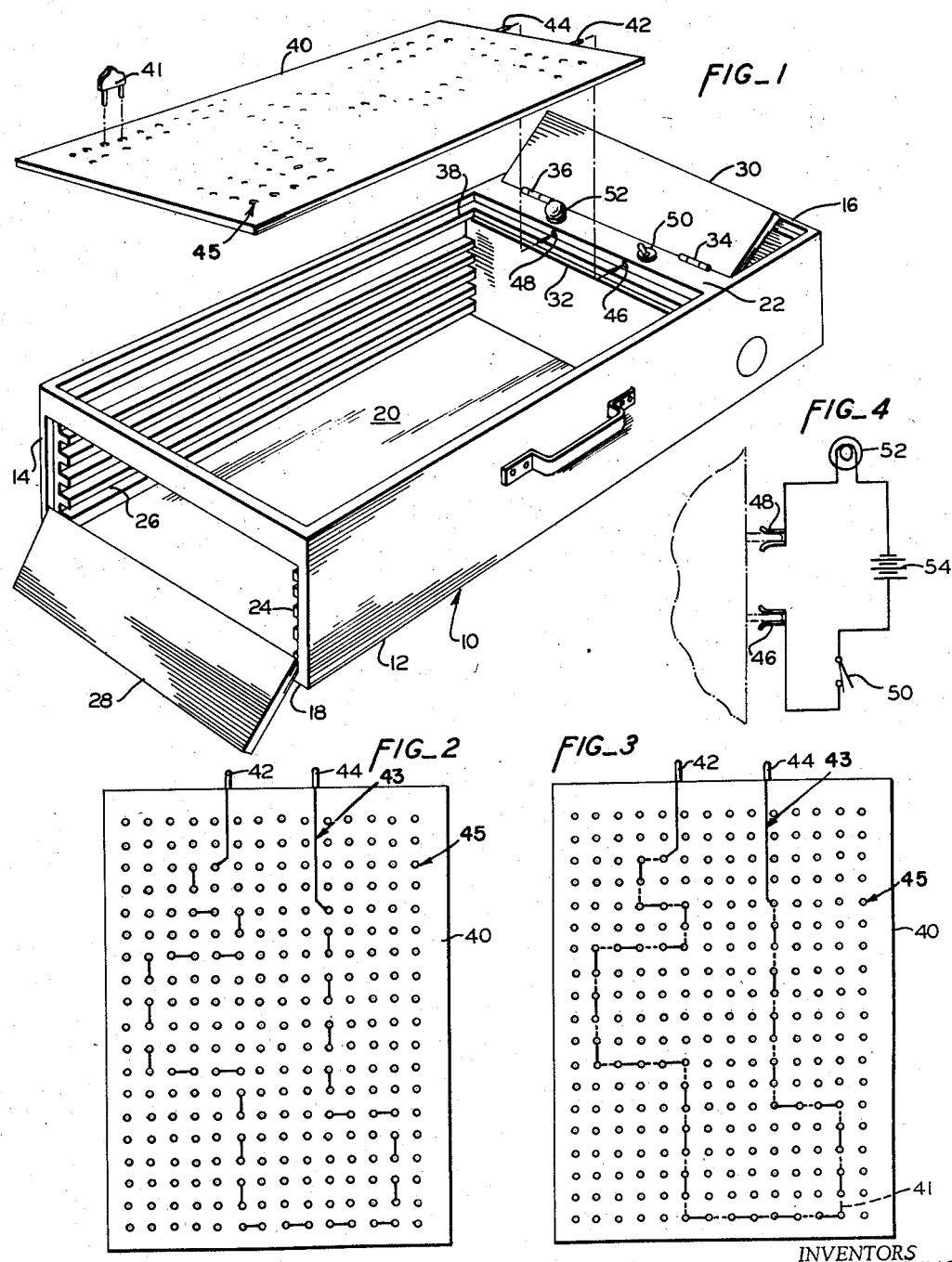
INVENTORS
JOHN F. ALLING
ALFRED R. FLEISCHER
BY
*Naylor + Neal*
ATTORNEYS

United States Patent Office 2,893,137
Patented July 7, 1959

2,893,137

PORTABLE TRAINING DEVICE FOR ELECTRIC ACCOUNTING MACHINE OPERATORS

John F. Alling and Alfred R. Fleischer, Pleasant Hill, Calif., said Fleischer assignor of two-fifths to said Alling Application July 22, 1957, Serial No. 673,289

3 Claims. (Cl. 35—19)

This invention relates to devices designed for the instruction of electric accounting machine personnel and in particular, to devices adapted to train such personnel in the wiring of the control panels pertaining to these electric accounting machines and the like.

The innumerable applications which these machines have found to date and will find in the future in business, industry, science and many other fields require the accelerated training of an ever growing personnel for their operation and, specifically, the adoption of improved and more efficient training methods and equipment.

Although one and the same machine can be used in connection with an infinity of problems, the control panel wiring will have to be changed in accordance with the particular use to which the machine is put and these changes effectuated by skilled operators. In the past, the practice has been to instruct the trainee by having him draw various wire connections on diagrams printed on paper and representing the control panel. The connections were then checked by an instructor. The trainee could then proceed to perform the actual wiring on a metal control panel, insert it in an electric accounting machine and subsequently solve the particular problem that had been assigned to him. The solution would then also be checked by the instructor.

The drawing of the required wire connections on paper does not give the student actual wiring experience and much of the instructor's time goes into checking it.

The subsequent wiring of an actual control panel for its insertion in an electric accounting machine to solve a particular problem is the only practice in wiring available to the student and it will be apparent that where a fairly numerous class is taught, the available machine might not suffice to the demand for its use.

An object of the present invention is to provide a device for the intruction of electric accounting machine operators which will enable a trainee both to practice control board wiring and to automatically check the correctness of his work, without recourse to an electric accounting machine.

Another object of this invention is to provide a device such as stated above which will permit a plurality of possible wirings corresponding to various applications of an electric accounting machine encounterable in practice.

A further object of this invention is to provide a device such as stated above, and which will be simple, inexpensive to manufacture, compact and portable.

Further objects and advantages of the invention will be brought out in the following part of the specification. Reference should be had to the accompanying drawings for a better understanding of the invention, wherein:

Figure 1 is a perspective and exploded view of the carrying case which is an essential part of the invention, a practice wiring control panel, hereinafter called "practice board," and a wiring jack insertable in two board apertures, hereinafter called "hubs";

Figure 2 is a plane view of the underside of a practice board before the wire connections are made;

Figure 3 is a view similar to Figure 2, showing the board with all wire connections established; and Figure 4 is the diagram of a permanent electrical installation embodied in the carrying case.

Referring to the drawings in detail, carrying case 10 comprises lateral walls 12 and 14, multi-ribbed panels 24 and 26 fixedly secured to the inner surfaces of said walls to support a plurality of superimposed practice boards in a parallel relation, said panels being slightly longer than the boards which they are made to accommodate, bottom wall 20, top wall 22 and end walls 16 and 18. Panel 28, pivotally rotatable around a hinge (not shown), is cut out of end wall 18 to permit removal and replacement of the various boards from and into the case.

Transverse partition wall 32, abutted against the inner extremities of panels 24 and 26, divides case 10 into a first compartment for the storage of the practice boards and a second compartment for the storage of the necessary wiring jacks, connecting wires, and for the housing of a permanent electrical installation to be described shortly.

Rectangular panel 30 is cut out of top wall 22 and pivotally rotatable around hinges 34 and 36 to permit access to said second compartment. A larger, rectangular section is cut out of top wall 22 and is replaceable by the particular practice board 40 to be wired. Shelf support 38 is provided to hold said board in position.

Each practice board has a partial circuit 43 printed on its underside, said partial circuit being connected to protruding male jacks 42 and 44. When said board is in place, jacks 42 and 44 are in engagement with female jacks 46 and 48 and thereby connected to the permanent electrical installation embodied in case 10 and schematically shown in Figure 4. Switch 50 and light 52 are part of said installation.

With reference to Figure 2, showing the underside of practice board 40, as an example, a printed, plurally interrupted partial electrical circuit 43 joins a number of predetermined female jacks, or terminals, 45 extending through and positioned in the board. Figure 3 shows the same view, but here the missing connections are replaced by the correct positioning of wiring jacks, or other wiring means, on the upper side of the panel, said jack connections being shown by dotted lines. Contact between the upper side partial circuit and the underside partial circuit is insured by the female jacks 45 connected to the adjoining printed circuit and adapted to engage the male wiring jacks.

Figure 4 shows a diagrammatic view of the permanent installation embodied in case 10. When practice board 40 is in place, all the connections established, and switch 50 in the closed position, power source 54, which can be a dry cell, causes a current to pass through this completed circuit and energize light 52.

It follows from the preceding that when a practice board is in position, i.e. male jacks 42 and 44 are in engagement with female jacks 46 and 48, and the upper side of the board has been correctly wired by proper placement of jacks 41, said wiring corresponding to an electric accounting machine control panel wiring for a given problem, closure of the switch will permit a current to flow through the circuit and energize indicator lamp 52, thereby indicating that the wiring for the particular problem has been correctly done.

It should be pointed out that compound practice boards, i.e. boards divided into several sections (e.g. four) each of which has a different printed wiring and adapted to reproduce a different problem, can be manufactured along with the corresponding carrying case. The various sections can then be selectively connected to the source of current by means of an appropriate switch.

It is the intention to cover all changes and modifications of the example of the invention herein shown which do not depart from the spirit and scope of the invention defined in the appended claims.

What is claimed is:

1. A portable electric accounting machine operator training kit comprising a carrying case, a first partial electrical circuit embodied in said case including a source of electrical current and energizable indicator means to indicate the passage of a current through said first partial circuit, a practice board corresponding to an electric accounting machine control panel removably positioned in said case, said board having positioned therein and extending therethrough a plurality of female jacks, pre-selected pairs of said female jacks being interconnected by fixed conductor means to constitute a discontinuous second partial circuit adapted to be made continuous by the bridging of said pairs of hubs by male jack conductors, and means separably interconnecting said first and second partial circuits adapted when said second partial circuit is made continuous to form an integrated complete circuit through which an electric current may flow to energize said indicator means.

2. A portable electric accounting machine operator training kit as set forth in claim 1, said first partial circuit embodying means to interrupt a current passing through said complete electrical circuit.

3. An electric accounting machine operator training kit comprising a practice board having obverse and reverse sides and being simulative of an electric accounting machine control panel, a plurality of female jacks positioned in and extending through said board, a plurality of pre-placed leads carried on the reverse side of said board in connecting relation with pre-selected pairs of said female jacks, said leads being adapted to be uninterruptedly connected together upon insertion into said female jacks at the obverse side of said board of a plurality of male jacks in bridging relation with said pre-selected pairs of female jacks, said pre-placed leads constituting a portion of a particular electric accounting machine wiring diagram to be worked out by a trainee operator and the placement pattern of said male jacks constituting the balance of said wiring diagram, and means for determining that said leads are uninterruptedly connected together comprising a source of current, energizable indicator means connected to said source, and means for connecting said source across said leads.

References Cited in the file of this patent
UNITED STATES PATENTS

| | | |
|---|---|---|
| 2,477,653 | Roane | Aug. 2, 1949 |
| 2,568,535 | Ballard | Sept. 18, 1951 |
| 2,592,552 | De Florez et al. | Apr. 15, 1952 |

FOREIGN PATENTS

| | | |
|---|---|---|
| 161,587 | Switzerland | July 17, 1933 |

OTHER REFERENCES

Article by Leslie in Radio-Electronics, February 1957 (vol. 28, No. 2), pages 78, 79 and front cover only. (Periodical in Sc. Library.)